UNITED STATES PATENT OFFICE.

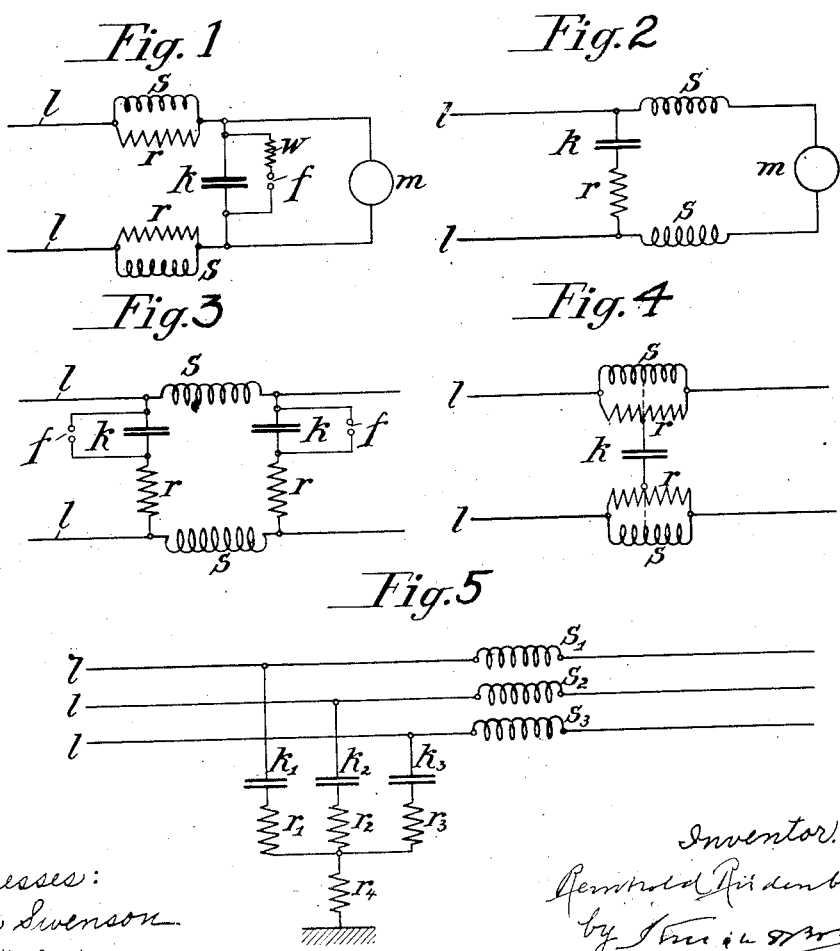

REINHOLD RÜDENBERG, OF CHARLOTTENBURG, GERMANY, ASSIGNOR TO SIEMENS-SCHUCKERT WERKE, G. M. B. H., OF BERLIN, GERMANY, A CORPORATION OF GERMANY.

MEANS FOR PROTECTING ELECTRIC CIRCUITS FROM EXCESSIVELY-HIGH DIFFERENCES OF POTENTIAL AND SIMILAR DISTURBANCES.

1,093,477.     Specification of Letters Patent.     Patented Apr. 14, 1914.

Application filed March 14, 1913. Serial No. 754,314.

*To all whom it may concern:*

Be it known that I, REINHOLD RÜDENBERG, a citizen of the German Empire, and residing at Charlottenburg, near Berlin, Germany, have invented certain new and useful Improvements in Means for Protecting Electric Circuits from Excessively-High Differences of Potential and Similar Disturbances, of which the following is a specification.

My invention relates to apparatus for protecting electric circuits from excessive rises in pressure and similar disturbances.

The invention consists in the arrangement and combination of parts described hereinafter and pointed out in the claims.

The objects of the invention are described hereinafter with reference to the accompanying drawing, wherein:—

Figures 1 and 2 show two forms of my protective means when applied to the end of the line, Figs. 3 and 4 show two modified forms of the same when applied between two sections of the line, and Fig. 5 shows another modified form of the same as applied to multiphase circuits and to protection against grounding.

As is well known, electrical apparatus and machinery which are connected to long aerial lines or cables can be protected from the admission of abnormal voltage waves by connecting a choking coil in the line. Each voltage or current wave which travels along such line and represents a rapidly moving excessive or reduced voltage as compared with the normal working voltage is intended to be reflected by such a protective choking coil and to be sent back onto the line. In reality this protective device is limited in its action since, on the one hand, its concentrated self-induction cannot be made as high as desired and, on the other hand, when there are very rapid disturbances, e. g. sudden rises in voltage which occur when switching lines and apparatus into circuit, the entire self-induction of the protective choking coil does not come into play but only a portion thereof which can fall as low as the leakage induction between two adjacent turns. Another form of protective device is known in the art in which any disturbing wave is reflected at the terminals of a condenser interposed between the line and ground, so that only a small portion of the disturbance, depending on the size of the condenser, can enter for instance the machine fed by the line. Perfect protection of the windings of such machine is, however, not afforded by this system.

The protective choking coil and the protective condenser have the common drawback that, although without appreciably influencing the low-frequency working current they do keep away from the machine to a certain extent all disturbances in voltage lasting a very short time, they nevertheless reflect this energy of the disturbing wave back onto the line without weakening it. The disturbing waves being thus continually reflected therefore travel to and fro on the line until they are finally dissipated owing to the very low resistance of the line. Each reflection by a device for keeping back these waves is, as already stated, not perfect, but such a device allows a portion of the disturbance to pass on, whereby the windings of the electrical machine are continually abnormally strained until the disturbing wave is completely dissipated.

In order to annihilate the energy of the disturbing wave it has heretofore been proposed to connect into the line a concentrated self-induction and a resistance in parallel therewith, or to connect between two lines, or between the lines and ground a concentrated capacity and a resistance in series with it. Both of these arrangements have no material influence on the low-periodicity working current, because in the arrangement, using a concentrated inductance with shunt resistance, the current can flow through the inductance having very little resistance, and in the arrangement, using a capacity with resistance in series, the current is effectively prevented by the condenser from passing over into the other line.

In order to be able with these last described protective devices to absorb the energy of the disturbing wave as quickly as possible the resistance in parallel to the inductance must be given twice, and the resistance in series with the capacity must be given one-half the value of the line characteristic, this characteristic being the square root of the quotient of self-induction and capacity per unit length of the lines. Half the energy is converted into Joule's heat, one quarter of the energy of the incoming wave is reflected, and the last quarter passes through the protective device into the second section of the line. It will therefore be readily understood from the above that these arrangements do not afford effective protection against powerful disturbing waves, since both the reflected disturbing-wave as well as that which passes through have half the current and voltage amplitudes of the original wave. In order that the wave which passes through may be smaller the value of the ohmic resistance must be considerably changed, but thereby the advantage of rapid absorption of energy is lost, and the effect of the arrangements will approximate to that of the devices described at the beginning.

A primary object of my invention is to obviate the above defects, and to provide protective means which will perfectly absorb the incoming disturbing wave and convert its energy into Joule's heat. The incoming wave can then neither be reflected nor pass through the protective means to the line beyond. To this end I do not employ only self-induction and resistance, or only capacity and resistance, each of which combinations by themselves are insufficient to produce the effect desired, but I employ in combination the three necessary elements, viz., concentrated self-induction, concentrated capacity, and an ohmic resistance adapted to the characteristic of the line $\sqrt{\frac{L}{c}}$, and I arrange that these elements are connected simultaneously at adjacent points on the line as shown.

It is obvious that the protective device must comprise ohmic resistance for annihilating the energy of abnormal waves of any form. Accordingly, the term ohmic resistance as used in this specification is to be understood as including any device in which energy is dissipated or converted into another form of energy. That self-induction and capacity must be conjointly employed can be explained by the fact that a concentrated inductance reflects any incoming rapid voltage wave substantially with the same sign, but that a concentrated capacity sends back the voltage wave onto the line substantially with a reversed sign. If it is desired to effect the extinction of the reflected wave, this can therefore be brought about only by the conjoint action of self-induction and capacity, whose individual reflected waves neutralize each other. When by suitably proportioning the resistance provision is made for complete absorption of the incoming disturbing waves, this protective device will allow no energy to pass through it. Theoretically it follows that in this ideal case the ohmic resistance must be about equal to the characteristic of the loop of line to be protected almost independently of the particular construction of the protective device.

Referring now to Fig. 1, very effective protective means according to my invention are here shown. In the line $l$ leading to a machine $m$ to be protected are interpolated concentrated inductances $s$, while behind these a condenser $k$ is connected between the lines. The resistances $r$ are connected in parallel with the inductances. The normal working current is not materially influenced by the protective apparatus, but flows through the inductances $s$ and passes by the capacity $k$. Any rapid, disturbing wave arriving from the line $l$, however, cannot enter the inductance $s$, but finds a path through the resistance $r$. It is reflected at the condenser $k$ so that it must again pass through the resistance. If the values of the self-induction and capacity were infinite, the energy of the disturbance would be completely annihilated by the resistance. Since, however, both these values must be made definite, there will be slight divergences from this ideal case, but as theory shows it is possible to employ for each value of the self-induction such a value of the damping resistance $r$ that only an exceedingly small amount of the incident wave is allowed to pass or is reflected.

Fig. 2 shows another protective device which operates in a manner similar to that just described. The condenser $k$ is here provided with a series resistance $r$ and is connected between the lines $l$ in front of the inductances $s$. The mode of operation of this arrangement corresponds entirely with that of the arrangement just described. It is here more clearly seen that the waves reflected by the capacity and self-induction, being of reversed signs, can neutralize each other, so that the entire energy of the disturbing wave can be dissipated in the resistance $r$. This protective device can be employed in the same way as in front of apparatus at the end of electric lines, or at any other desired places on the line itself, e. g. where the aerial lines are connected to insulated cables. In order to annihilate wave-trains from both sides it is preferable to duplicate either the condensers or inductances with their resistances. Fig. 3 shows such an arrangement. The resistances $r$ are of course preferably given different values when lines of different characteristics are connected together. While Fig. 3 represents the duplicated form of the arrangement shown in Fig. 2, Fig. 4 shows the arrangement shown in Fig. 1 when modified for absorbing waves which enter from both sides. This arrangement shown in Fig. 4 is specially advantageous in that the inductances connected in the principal lines need not be connected, at the places shown in dotted lines, with the junction points of the condenser and resistances, whereby, on the one hand, less apparatus is required and, on the other hand, the risk present in the arrangement shown in Fig. 1 of the network being short-circuited through flash-overs at the condenser is now avoided because there is always some resistance in series.

As the values of the damping resistances very materially depend on the characteristics of the line to be protected resistances of different values will frequently be employed for the various lines of a multiphase system. The characteristic of any line relative to ground is generally greater than the characteristic relative to one of the other lines, so that it is desirable to make that damping resistance of the protective device considerably greater relatively to ground. Then not only will all the disturbing voltage waves which travel between two lines be perfectly absorbed when they reach the protective device, but also any voltage wave which travels between any particular line and ground will be completely annihilated. Fig. 5 shows a protective device of this kind, wherein the resistances $r_1$, $r_2$, $r_3$ serve for damping purposes for the lines themselves, and the resistance $r_4$, as an auxiliary damping medium to ground.

In none of these protective devices can free electric oscillations occur, notwithstanding the simultaneous presence of condensers and inductances, because the damping resistance must in itself be of such a value that any natural vibration is suppressed. On long distance lines a number of such protective devices may, of course, be arranged, so that rapid equilibrium disturbances occurring on any one section of the line cannot pass the protected ends of this section, but will be dissipated there. To obtain with certainty the complete absorption of the disturbing waves it may be preferable to connect several of the described protective devices in series in order to dissipate with certainty that remnant of the waves which passes through one protective device because the capacity and self-induction have finite values.

The resistances employed for annihilating the disturbing waves are preferably made of material of high specific resistance so that they may be of short length and may really operate as concentrated ohmic resistances. The terms concentrated self-induction and capacity as used herein include any artificial increase in the inductivity of the line or in the capacity. It is not absolutely necessary that special condensers and inductance coils be connected in circuit. An effective concentrated inductance can, for example, be produced by leading the current-carrying line through thin, concentric disks of sheet iron, in which a powerful self-induction field can form. These disks may have between them an air-gap in order to reduce the effect of varying permeability. Beside electrostatic and electrolytic condensers I may connect in the line, for example, short lengths of cable which have a considerably higher capacity than the line to be protected.

The above described protective device has the advantage not only of discharging its function, as most of the previous protective devices have done, when the rises of potential are considerably above the normal voltage of the system, but also of annihilating any very small disturbing waves.

When very considerable rises in potential above the voltage of the system occur, the dielectric of the condensers is of course considerably strained. To protect it against puncture, preferably spark-gaps $f$ (Figs. 1 and 3) may be connected in parallel with the condensers, which short-circuit the condensers when they are very much overstrained and so, on the one hand, protect their dielectric and, on the other hand, just because of the short-circuit which acts as a condenser of infinite size, do not affect the action of the protective device for excess voltages. If desired, other damping resistances $w$ as shown in Fig. 1 may be connected in series with these protective spark-gaps, and be partly or wholly united with the damping resistances of the condensers. Electrolytic condensers provide in themselves favorable conditions for discharge and therefore, in general, need no special spark-gaps in parallel with them.

I claim:—

1. In an electric circuit the combination with a line constituting one side of the circuit, of a concentrated inductance inserted into the line, a concentrated capacity connected between the line and the other side of the circuit, and a resistance connected in series with said capacity.

2. In an electric circuit comprising several lines, the combination with said lines, of a concentrated inductance inserted into each of said lines, a concentrated capacity connected between said lines, and resistance connected in series with each of said capacities.

3. In a polyphase electric circuit, the combination with the lines, of a concentrated inductance inserted into each of said lines, a star connection between said lines, each branch containing a resistance and a capacity in series, and a connection between the ground and the neutral point of the star, said connection also containing a resistance.

In testimony whereof, I have signed my name to this specification in the presence of two witnesses.

REINHOLD RÜDENBERG.

Witnesses:
 WOLDEMAR HAUPT,
 HENRY HASPER.